United States Patent [19]

Hahn

[11] Patent Number: 4,832,657

[45] Date of Patent: May 23, 1989

[54] CONSTANT VELOCITY UNIVERSAL JOINT FOR TRANSMITTING A TORQUE AT VARIOUS ANGLES

[75] Inventor: Steven C. Hahn, Mt. Clemens, Mich.

[73] Assignee: GKN Automotive Inc., Auburn Hills, Mich.

[21] Appl. No.: 93,630

[22] Filed: Sep. 8, 1987

[51] Int. Cl.[4] .............................................. F16D 3/21
[52] U.S. Cl. ...................................... 464/141; 464/906
[58] Field of Search ........................ 464/139, 141, 906

[56] References Cited

U.S. PATENT DOCUMENTS

| | | | |
|---|---|---|---|
| 1,985,278 | 12/1934 | Bradley | 464/906 X |
| 3,310,961 | 3/1967 | Ristau | 464/906 X |
| 3,324,683 | 6/1967 | Schroter | 464/906 X |
| 3,464,232 | 9/1969 | Hutchinson | 464/906 X |
| 3,802,221 | 4/1974 | Kimata | 464/141 |
| 3,875,762 | 4/1975 | Tampalini | 464/906 X |
| 4,078,400 | 3/1978 | Krude | 464/906 X |
| 4,156,354 | 5/1979 | Krude | 464/141 |
| 4,191,031 | 3/1980 | Girguis et al. | 464/906 X |
| 4,493,676 | 1/1985 | Krude | 464/141 |
| 4,549,873 | 10/1985 | Krude | 464/141 |

FOREIGN PATENT DOCUMENTS

| | | | |
|---|---|---|---|
| 1185868 | 1/1965 | Fed. Rep. of Germany | 464/141 |
| 794101 | 2/1936 | France | 464/139 |
| 2115521 | 9/1983 | United Kingdom | 464/141 |
| 2171492 | 8/1986 | United Kingdom | 464/141 |

Primary Examiner—Daniel P. Stodola
Attorney, Agent, or Firm—Remy J. VanOphem

[57] ABSTRACT

A constant velocity universal joint for transmitting driving torque between rotative members, including an outer race member with an axial annular recess therethrough, the annular recess in the outer race member being enlarged at one end to accommodate an inner race member that has a bulbous end with a plurality of radially aligned circumferentially spaced bores positioned in the bulbous end. The inner race member also has an axially positioned bore in the bulbous end. A pin is positioned in the bore within the bulbous end and a plurality of spherical balls are positioned in the bores so that each spherical ball rests against the outer surface of the pin. The inner race member and the spherical balls telescope into the outer race member and are restrained from axial separation by a restraining ring seated in the outer race member.

19 Claims, 1 Drawing Sheet

CONSTANT VELOCITY UNIVERSAL JOINT FOR TRANSMITTING A TORQUE AT VARIOUS ANGLES

BACKGROUND OF THE INVENTION

1. Field of the Invention

The present invention relates to a constant velocity universal joint for use in any application requiring torque transmission through a varying angle. More particularly, the invention involves a universal joint with an outer race member that has an annular recess with a plurality of equally spaced grooves therein. An inner race member is positioned within the annular recess of the outer race member. The end of the inner race member that is positioned in the annular recess of the outer race member contains a plurality of circumferentially spaced spherical balls which roll in the plurality of grooves of the outer race member. The exterior surface of each spherical ball rests against an axially aligned pin which is mounted integral with the inner race member.

2. Description of the Prior Art

The prior art reveals a wide variety of devices for the transmission of torque through an angle. In general, most of the prior art devices utilize an outer member with an inner member positioned therein. Either spherical balls or modified cylindrical roller bodies are positioned between the outer and inner members to facilitate articulation of the device.

The present invention is an improvement over the constant velocity universal joint described in U.S. patent application Ser. No. 945,183, filed Dec. 23, 1986, which is a file wrapper continuation of Ser. No. 704,196 filed Dec. 22, 1985, assigned to GKN Automotive Components Inc., and entitled "Constant Velocity Universal Joint and Apparatus Embodying the Same," hereinafter referred to as the CV universal joint. The above referenced prior art disclosed constant velocity universal joints for connecting drive and driven members when the members are in high speed operation, offset at an angle, or have misalignment between the members. The universal joint has an outer race member with an inner race member positioned therein. A plurality of spherical balls are positioned in an aperture in the inner race member and engage grooves that are positioned in the interior of the outer race member. The spherical balls contact one another, thus, providing mutual support for each other inwardly of the inner race member towards the center of the joint. A quick disconnect version of the invention that employs a centrally located movable pintle is also shown.

A constant velocity universal joint shown and described in U.S. Pat. No. 3,802,221 entitled "Constant Velocity Universal Joint" and issued Apr. 9, 1974, to Kei Kimata, shows an outer member with an axially aligned enlarged bore therein. One end of the enlarged bore is dimensioned so as to accommodate one end of a torque member. The other end of the enlarged bore is of reduced diameter so that a cantilevered central shaft can be fixedly positioned therein. The cantilevered central shaft is axially positioned and occupies part of the volume of the enlarged portion of the axially aligned bore. A torque member with a hollow end has radially disposed bores so as to accommodate a plurality of spherical balls in the bores. During assembly of the universal joint, the torque member is installed into position so that the cantilevered central shaft carried by the outer member is positioned within the center of the plurality of spherical balls. The structure forming the hollow end of the torque member and the spherical balls carried therewith occupy the space between the cantilevered central shaft and the inside surface of the bore of the outer member.

U.S. Pat. No. 4,156,354 entitled "Angularly Flexible Cardan Shaft Joint" and issued May 29, 1979, to Werner Krude, shows a high speed, high-torque transmitting universal joint where the torque is transmitted through chamfered roller bodies interposed between inner and outer joint members wherein the roller bodies are equidistantly spaced circumferentially of the joint assembly, with each roller body being received in planar recesses in the inner joint member for radially slidable engagement relative thereto. The above described universal joint increases the complexity and size of the joint and requires close maintenance of surface finish and other manufacturing tolerances. Because of these reasons and the increased friction resulting from the sliding relationship of the planar surfaces, this type of joint has decreased smoothness of operation while at the same time having increased manufacturing costs.

One embodiment, particularly depicted in FIGS. 3 and 4 of the drawings, shows a torque transmitting shaft with a bulbous end that has an axially positioned bore. An elastomeric block or pad is positioned in the central space between the roller bodies, however, the block or pad is a non-load carrying member, hence, it functions in a manner which does not affect the actual joint function of the overall assembly.

Thus, it can be observed that the utilization of a centrally positioned block or pad within the bulbous end of the torque transmitting shaft does not enhance the load carrying capabilities of the universal joint nor does it decrease the friction that results because of the sliding relationship of the planar surfaces. For the above set forth reasons, the centrally positioned block or pad provides a less than satisfactory solution to the problem of torque transmission.

SUMMARY OF THE PRESENT INVENTION

The present invention is a constant velocity universal joint for use in any application requiring torque transmission through a varying angle. The invention includes an outer race member with an annular recess extending partially therethrough. One end of the annular recess is enlarged so that it can accommodate the end of an inner race member. An inner race member with a bulbous end is mounted within the enlarged portion of the annular recess of the outer race member. The bulbous end of the inner race member has a plurality of radially aligned circumferentially spaced bores that coincide with the maximum radius of the bulbous end and are for the reception of spherical balls. The bulbous end of the inner race member also has an axially aligned bore that contains an axially positioned pin. The exterior surfaces of the spherical balls that are positioned within the radially aligned bores of the bulbous end of the inner race member each contact the exterior surface of the axially aligned pin carried by the inner race member.

The combination of an axially positioned pin within the end of the inner race member permits the use of smaller spherical balls, thus a stronger inner race member can be built without increasing the overall dimensions of the universal joint. The utilization of smaller balls results in small radial bores in the bulbous end of the inner race member; consequently, there is more structural material positioned between each of the spherical balls. Also, the present invention can be articulated to a greater degree while still delivering an acceptable torque transmission with a minimum of effort and vibration since the inner race member is coupled to the outer race member only through spherical balls.

A primary object of the present invention is to provide a constant velocity universal joint that has increased strength and angular movement without an increase in the overall size of the universal joint.

Another object of the present invention is to decrease the size of the spherical balls utilized in the transmission of torque, thus, permitting an increase in strength of the inner race member.

A further object of the present invention is to provide that the spherical balls used in transmitting torque in a constant velocity universal joint are all in contact with a common pin.

Still another object of the present invention is to transmit rotational power between two nonaligned shafts.

A further object of the present invention is to provide a constant velocity universal joint with a plurality of spherical balls that travel in grooves in the outer race member thereof, the grooves having cylindrical contact with the spherical ball surfaces.

Another object of the present invention is to provide a constant velocity universal joint with lower manufacturing costs.

A further object of the present invention is to provide a constant velocity universal joint having increased smoothness of performance.

A further object of the present invention is to provide a constant velocity universal joint having increased running life.

A still further object of the present invention is to provide a universal joint that can be adapted for use in association with hand tools.

Further objects and advantages of the present invention will become apparent from the following description and the appended claims, reference being made to the accompanying drawings forming a part of this specification, wherein like reference characters designate corresponding parts in the several views.

It is to be understood that the present invention is not limited in its application to the details of construction and arrangement of parts illustrated in the accompanying drawings, since the invention is capable of other embodiments and of being practiced or carried out in various ways within the scope of the claims. Also, it is to be understood that the phraselogy and terminology utilized herein is for the purpose of description and not of limitation.

DETAILED DESCRIPTION OF THE PREFERRED EMBODIMENT

Figure 1:
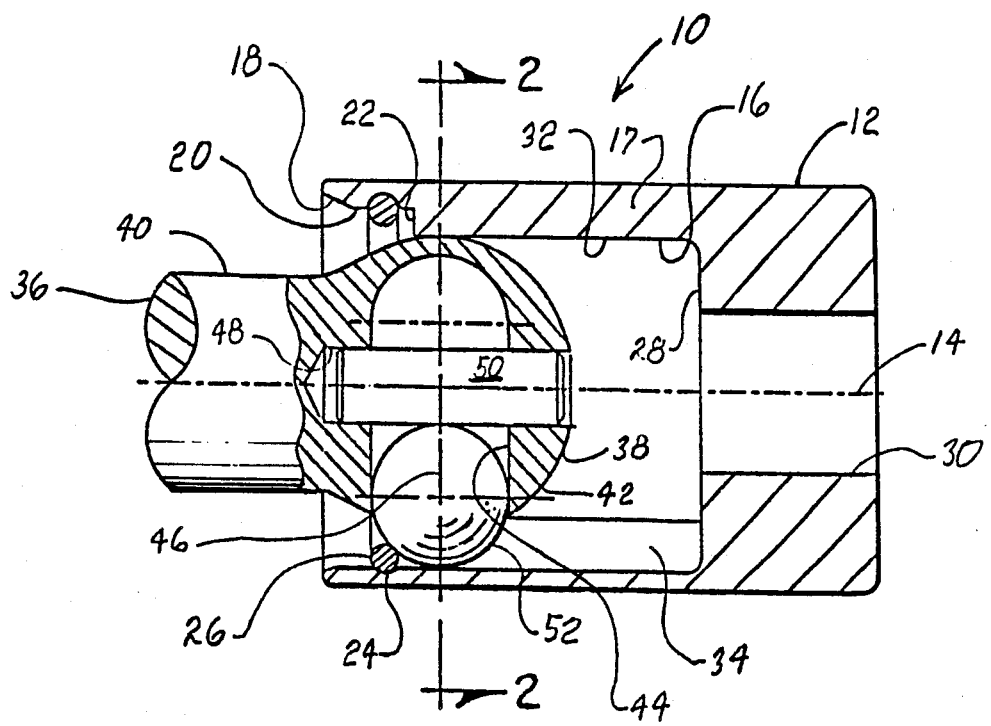
FIG. 1 is a side elevational view, partly in section, of the constant velocity universal joint of the present invention.
Figure 2:
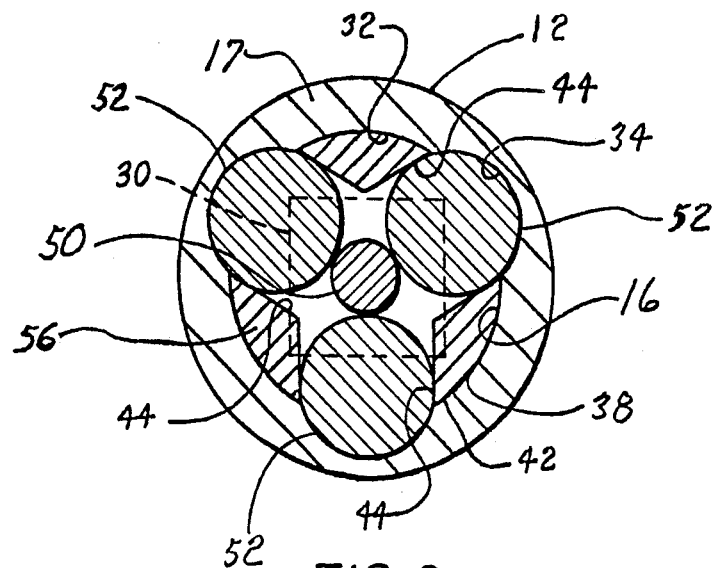
FIG. 2 is a sectional view taken along the line 2—2 of FIG. 1 that shows the relative position of the spherical balls and the centrally positioned pin.

Referring now to the drawings, and more particularly to FIGS. 1 and 2, there is illustrated a constant velocity universal joint that has application for many uses, such as the coupling of drive shafts and ratchet wrenches as employed with hand tools.

FIG. 1 shows an overall assembly 10 of the constant velocity universal joint of the present invention. An outer member 12 is of generally annular configuration with a longitudinal axis 14 passing therethrough. The outer race member 12 contains a centrally positioned annular recess 16 that defines a wall 17 therein. The annular recess 16 has a chamfered lip 18 to break what would normally be a sharp reentrant edge of the annular recess 16. Inboard, or to the right of the chamfered lip 18, as viewed in FIG. 1, is a cylindrical section 20. The outer edge of the cylindrical section 20 meets with an edge of the chamfered lip 18 so as to form a juncture that permits ready access to the interior of the annular recess 16. The inner edge of the cylindrical section 20 terminates at a radially inward shoulder 22 which is shown by way of example as planar in configuration and perpendicular to the longitudinal axis 14. A groove 24 is positioned in the central portion of the cylindrical section 20. The groove 24 is cylindrical in cross-section so that it can readily accommodate a retaining ring 26 that is positioned therein. The retaining ring 26 prevents disengagement of the universal joint by providing a stop against which one or more spherical balls 52 will impinge should axial separation of the outer race member 12 from the inner race 36 occur or during severe articulation of the universal joint. The annular recess 16 is of generally cylindrical configuration as it extends from the radially inward shoulder 22 to a radially extending wall 28. The radially extending wall 28 is shown as perpendicular to the longitudinal axis 14, although it need not necessarily be perpendicular since some forming techniques would produce a wall configuration with a concavity therein. A connection socket 30 is positioned in the right-hand end of the overall assembly 10 as viewed in FIG. 1 of the drawings. The connection socket 30 is preferably square in cross-section, however, other socket cross-sectional configurations would work equally well. The recess formed by the connection socket 30 is shown in communication with the remainder of the annular recess 16, although there need not be such communication for the invention to function in a proper manner.

That portion of the annular recess 16 that extends from the radially inward shoulder 22 to the radially extending wall 28 is a cylindrical bore and is identified by numeral 32 as shown in the drawings. A plurality of circumferentially spaced grooves 34 are positioned along the inside of the cylindrical bore 32. The grooves 34 are generally annular in configuration and extend in the radial direction into the wall 17 a greater distance from the longitudinal axis 14 than does the surface of the cylindrical bore 32. The grooves 34 are arcuately spaced 120 degrees apart, and are parallel to one another and to the longitudinal axis 14. The outer race member 12 can be manufactured by many techniques well known in the art, such as machining and drop forging.

The inner race member 36 is partially positioned within the annular recess 16 of the outer race member 12. The inner race member 36 is elongate in configuration and only that end adjacent the outer race member 12 is depicted in the drawings. The inner race member 36 has a longitudinal axis and for purposes of illustration that axis will also be designated as longitudinal axis 14. The inner race member 36 has a bulbous end 38 attached to a reduced diameter shaft 40. An exterior surface 42 of the bulbous end 38 is spherical in configuration. A plurality of circumferentially spaced cylindrical bores 44 are positioned within the bulbous end 38 of the inner race member 36. For purposes of illustrating the present invention, three cylindrical bores 44, arcuately spaced 120 degrees from one another are shown in FIG. 2 of the drawing. The cylindrical bores 44 are perpendicular to the longitudinal axis 14 of the inner race member 36. Regardless of the number of cylindrical bores utilized, the bores are preferably spaced equidistant around the circumference of the bulbous end 38. In addition to the above described spacing of the cylindrical bores 44, they are positioned so that their axes 46 pass through the greatest radial extent of the exterior surface 42 of the bulbous end 38, thus, permitting a maximum of structural material to exist between the spherical balls 52.

A pin bore 48 is positioned in the bulbous end 38 of the inner race member 36. The pin bore 48 is in alignment with the longitudinal axis 14 of the inner race member 36. As can be seen in FIG. 1, the pin bore 48 is in communication with each of the cylindrical bores 44. A pin 50 of generally cylindrical configuration is positioned within the pin bore 48, by techniques well known in the art. One spherical ball 52 is positioned in each one of the cylindrical bores 44. The diameter of the spherical ball 52 is slightly less than the internal diameter of the cylindrical bore 44. Also, the diameter of the spherical ball 52 is no greater than the diameter of the groove 34 in the outer race member 12.

FIG. 2, which is a sectional view taken along the line 2—2 of FIG. 1, shows the interrelationship of the various components of the overall assembly 10 that have heretofore been described. FIG. 2 is a view in which the longitudinal axis 14 of the outer race member 12 and the inner race member 36 coincide, therefore, the axis 46 of each cylindrical bore 44 is perpendicular to the longitudinal axis 14 of the overall assembly 10. As can be seen in FIG. 2, the spherical balls 52 are positioned in the cylindrical bores 44. Each spherical ball 52 is in rolling engagement with the internal surface of its cylindrical bore 44. In addition, each spherical ball 52 is in rolling engagement with the apex of the cylindrical curvature of its mating groove in the outer race member 12. All of the spherical balls 52 are in contact with the pin 50. The distance between the the pin 50 and the most radial outward extent of the groove 34 is just slightly greater than the diameter of the spherical ball 52, thus, assuring that the rolling action of the spherical ball 52 will not be inhibited. The pin 50 and the spherical balls 52 are of a hardness compatible with one another.

OPERATION AND ASSEMBLY

During the pre-assembly of the overall assembly 10, the pin 50 is installed in the pin bore 48 within the inner race member 36. The pin 50 is preferably press-fit or welded into the pin bore 48 so that it will not become disengaged during subsequent use of the overall assembly 10. The bulbous end 38 of the inner race member 36 is positioned so that it is at the entrance of the annular recess 16 in the outer race member 12. The spherical ball 52, aided by the chamfered lip 18, is positioned in each one of the cylindrical bores 44. The bulbous end 38 and its captured spherical balls 52 is then inserted into the annular recess 16 such that the balls 52 coincide with the grooves 34 in the outer race member 12. After the bulbous end of the inner race member 36 has been fully inserted, the retaining ring 26 is positioned, also with the aid of the chamfered lip 18, in the groove 24. If the inner race member moves to the left, as depicted in FIG. 1, one or more of the spherical balls 52 contact the fully positioned retaining ring 26, thus, preventing uncoupling of the overall assembly 10.

There are several types of loads encountered during the use of a universal joint. One loading condition is that of an applied torque wherein the axis of the outer race member 12 is essentially in alignment with the axis of the inner race member 36. This loading condition produces high stresses in the shell portion of the outer race member 12 which can cause local coining of the metal in the grooves 34 or an actual bending of the inner race member 36. Also a cyclic applied torque of high magnitude can cause coining of the internal surfaces of the cylindrical bores 44 or, in the worst case, an actual breaking of the material between the respective cylindrical bores 44. Another type of loading encountered by the overall assembly 10 are stresses induced by a moment that is applied to the universal joint, that is, the longitudinal axis 14 of the inner race member 36 becomes angularly displaced with respect to the longitudinal axis 14 of the outer race member to such an extent that the respective parts can no longer move within the overall assembly 10, consequently, the movement induced loads dislocate the retaining ring 26 from its groove 24 or, in a major fracture of the universal joint, the inner race member 36 fractures. While only two of the major loading conditions have been pointed out above, there are additional complex loading conditions that result because of the combination of the torque and bending loads.

The present invention is an improvement over the CV universal joint previously mentioned under the Description of the Prior Art. In the CV universal joint, a plurality of spherical balls are each positioned in individual bores in the inner race member. The bores are in communication with one another at the center of the bulbous end of the inner race member; consequently, each spherical ball contacts both of its adjacent spherical balls. The CV universal joint functions quite well under small torque loads, however, under higher torque loads the inner race member fails through the cross-section that contains the bores. Increased strength can be attained in the CV universal joint by increasing the size of the spherical balls, however, this change in geometry is self-defeating because both the inner and outer race members would also have to be increased in size.

The present invention has solved the problem of increasing the strength of a universal joint without increasing its overall exterior size. In order to increase the cross-sectional area designated as the numeral 56 in FIG. 2, the spherical balls 52 have been reduced in diameter and are held in spaced apart relationship to one another by the pin 50. Thus, in the present invention, the cross-sectional area 56 has been increased over the comparable cross-sectional area in the CV universal joint. The present universal joint has increased strength, however, its overall size has not increased over the CV universal joint of the prior art.

The present invention has certain features, not to be found in the prior art, that help to withstand the high loading conditions heretofore described. In order to make a stronger universal joint, the prior art designers tried to reduce the stresses within the universal joint by using larger spherical balls. The use of larger spherical balls did indeed increase the overall moment arm within the inner race of the universal joint, however, the larger spherical balls required larger bores; consequently, there remained less material between the spherical balls. The moment arm referred to above is the distance from the longitudinal axis of the inner race member to that point where the spherical ball contacts the cylindrical wall of the bore in which it is located. The universal joint of the present invention achieves a larger moment arm because the spherical balls 52 are smaller in diameter and are positioned at a greater distance from the longitudinal axis 14 of the inner race member 36.

In U.S. Pat. No. 3,802,221, heretofore commented on, an increased moment arm was achieved by moving the spherical balls radially outward from contact with one another and by positioning a pin between the spherical balls. The centrally positioned pin carried by the outer race member could not move angularly in unison with the spherical balls on the remainder of the inner race member when the inner race member underwent angular movement. Since universal joints are subject to high fatigue loading, the cantilevered pin carried by the outer race member would not be as strong as a pin support at both ends. Also, the free end of the pin would interfere with the inside surface of the spherical ball carrying member when the universal joint was operated at a severe angle.

In contrast, the present invention utilized the advantage of a centrally positioned pin within the inner race member 36 in order to position the spherical balls radially outward from the central longitudinal axis of the inner race member 36. When the inner race member 36 undergoes angular displacement with respect to the outer race member 12, the pin 50 also undergoes the same angular displacement. Thus, one of the inherent disadvantages of the prior art has been overcome. Since the design of the present invention provides support for both ends of the pin 50, it is capable of sustaining higher loads without deformation of the pin occurring.

Thus, by a rearrangement of the components as taught by the prior art, the present invention has provided a new and novel constant velocity universal joint that minimizes operational stresses, provides a compact design, and permits a large angular displacement. It should be understood that the invention is not limited to the foregoing embodiment, and that changes and modifications can readily be made by one skilled in the art without departing from the scope of the claims appended hereto.

What is claimed is:

1. A constant velocity universal joint for use between two shafts for transmission of power from a driving shaft to a driven shaft comprising:

an outer race member, having a longitudinal axis, with at least one recess located along said longitudinal axis;

a plurality of circumferentially spaced grooves parallel to each other and to said longitudinal axis of said outer race member positioned in a portion of a wall surrounding said at least one recess;

an inner race member, having a longitudinal axis, in the form of a shaft with a bulbous end attached thereto, said bulbous end positioned within said at least one recess;

a plurality of circumferentially spaced cylindrical bores positioned in said bulbous end, said plurality of circumferentially spaced cylindrical bores being perpendicular to said longitudinal axis and complementary with said plurality of circumferentially spaced grooves;

a spherical ball positioned in each of said plurality of circumferentially spaced cylindrical bores such that said spherical balls are in spaced apart relationship with respect to each other;

a pin bore provided in said bulbous end of said inner race member axially extending inwardly from the end thereof a distance beyond said plurality of circumferentially spaced cylindrical bores;

a pin disposed in said pin bore being supported therein on both sides of said plurality of circumferentially spaced cylindrical bores, said pin separating said spherical balls one from the other; and retaining means attached to said outer race member to prevent the decoupling of said inner race member from said outer race member during use of said constant velocity universal joint.

2. The constant velocity universal joint of claim 1 wherein said pin bore and said plurality of cylindrical bores are in communication with each other.

3. The constant velocity universal joint of claim 1 wherein said at least one recess is comprised of two parts, the first part comprising a cylindrical bore with said plurality of circumferentially spaced grooves therein and the second part comprising a connection socket.

4. The constant velocity universal joint of claim 3 wherein said cylindrical bore is in communication with said connection socket.

5. The constant velocity universal joint of claim 1 wherein said retaining means comprises a groove positioned in the cylindrical section of said wall adjacent the end of said outer race member and a retaining ring positioned in said groove.

6. The constant velocity universal joint of claim 5 wherein said outer race member has a chamfered lip on the end thereof to facilitate the installation of said spherical balls and said retaining ring.

7. The constant velocity universal joint of claim 1 wherein said plurality of circumferentially spaced grooves in said wall, said plurality of circumferentially spaced cylindrical bores, and said plurality of spherical balls are each three in number.

8. The constant velocity universal joint of claim 7 wherein said plurality of circumferentially spaced grooves and said plurality of circumferentially spaced cylindrical bores are each spaced 120 degrees apart.

9. A constant velocity universal joint for use between two shafts for transmission of power from a driving shaft to a driven shaft comprising:

an outer race member, having a longitudinal axis, with at least one recess located along said longitudinal axis;

a plurality of circumferentially spaced grooves positioned in a wall surrounding a portion of said at least one recess, said plurality of circumferentially spaced grooves being parallel to one another and to said longitudinal axis;

an inner race member, having a longitudinal axis, in the form of a shaft with a bulbous end formed as an integral part thereof, said bulbous end having an exterior surface that is spherical, said bulbous end being positioned within said at least one recess;

a plurality of circumferentially spaced cylindrical bores positioned in said bulbous end, said plurality of circumferentially spaced cylindrical bores being perpendicular to said longitudinal axis and complementary with said plurality of circumferentially spaced grooves, and in communication with each other;

a pin bore positioned in said bulbous end of said inner race member axially extending inwardly from the end thereof a distance beyond said plurality of circumferentially spaced cylindrical bores;

a pin positioned within said pin bore, said pin being supported therein on both sides of said plurality of circumferentially spaced cylindrical bores;

a spherical ball positioned in each of said plurality of circumferentially spaced cylindrical bores such that said spherical balls are in spaced apart relationship with respect to each other with said pin positioned in the interstice between said spherical balls; and retaining means attached to said outer race member to prevent the decoupling of said inner race member from said outer race member during use of said constant velocity universal joint.

10. The constant velocity universal joint of claim 9 wherein said at least one recess is comprised of two parts, the first part comprising a cylindrical bore with said plurality of circumferentially spaced grooves therein and the second part comprising a connection socket.

11. The constant velocity universal joint of claim 10 wherein said cylindrical bore is in communication with said connection socket.

12. The constant velocity universal joint of claim 9 wherein said retaining means comprises a groove positioned in a cylindrical section of said wall adjacent an end of said outer race member and a retaining ring positioned in said groove.

13. The constant velocity universal joint of claim 12 wherein said outer race member has a chamfered lip on the end thereof to facilitate the installation of said spherical balls and said retaining ring.

14. The constant velocity universal joint of claim 9 wherein said plurality of circumferentially spaced cylindrical bores, and said spherical balls are each three in number.

15. The constant velocity universal joint of claim 14 wherein said plurality of circumferentially spaced grooves and said circumferentially spaced cylindrical bores are each spaced 120 degrees apart.

16. A constant velocity universal joint for use between two shafts for transmission of power from a driving shaft to a driven shaft comprising:

an outer race member, having a longitudinal axis, with a cylindrical bore located along said longitudinal axis and in communication with a connection socket also located along said longitudinal axis;

three grooves, circumferentially spaced 120 degrees apart, positioned in a wall surrounding said cylindrical bore, said three grooves being parallel to one another and to said longitudinal axis;

an inner race member, having a longitudinal axis, and being elongate in form with a shaft on one end and a bulbous end opposite said shaft, formed as an integral part thereof, said bulbous end having an exterior surface that is spherical, said bulbous end being positioned within said cylindrical bore of said outer race member;

three circumferentially spaced cylindrical bores, spaced 120 degrees from each other, positioned in said bulbous end, said three circumferentially spaced cylindrical bores being perpendicular to said longitudinal axis and complementary with said three grooves, and in communication with one another;

a pin bore positioned along said axis in said bulbous end of said inner race member axially extending inwardly from the end thereof a distance beyond said three circumferentially spaced cylindrical bores;

a pin positioned within said pin bore, said pin being supported therein on both sides of said three circumferentially spaced cylindrical bores;

a spherical ball positioned in each of said three circumferentially spaced cylindrical bores such that each of said spherical balls can have contact with said pin, said pin positioned in the interstice between said spherical balls; and a groove positioned in a cylindrical section of said wall adjacent an end of said outer race member and a retaining ring positioned in said groove.

17. The constant velocity universal joint of claim 16 wherein said three circumferentially spaced cylindrical bores in said bulbous end coincide with a point of maximum diameter of said bulbous end.

18. The constant velocity universal joint of claim 16 wherein said outer race member has a chamfered lip on the end thereof adjacent said cylindrical bore to facilitate the installation of said spherical balls and said retaining ring.

19. The constant velocity universal joint of claim 16 wherein said connection socket is square in cross-section.

* * * * *

UNITED STATES PATENT AND TRADEMARK OFFICE
CERTIFICATE OF CORRECTION

PATENT NO.   : 4,832,657

DATED        : May 23, 1989

INVENTOR(S)  : Steven C. Hahn

It is certified that error appears in the above-identified patent and that said Letters Patent is hereby corrected as shown below:

Column 4, line 6, after "outer" insert ---- race ----.

Signed and Sealed this

Third Day of July, 1990

Attest:

HARRY F. MANBECK, JR.

*Attesting Officer*  *Commissioner of Patents and Trademarks*